United States Patent
Kono et al.

[11] Patent Number: 6,133,651
[45] Date of Patent: Oct. 17, 2000

[54] OUTAGE MANAGEMENT EMERGENCY POWER SUPPLY DEVICE

[75] Inventors: Shinichi Kono; Shigeki Hanyu, both of Yamanashi, Japan

[73] Assignee: Fanuc Ltd., Minamitsuru, Japan

[21] Appl. No.: 09/209,458

[22] Filed: Dec. 11, 1998

[30] Foreign Application Priority Data

Dec. 11, 1997 [JP] Japan .................................... 9-361707

[51] Int. Cl.[7] .................................................. H02J 7/00
[52] U.S. Cl. ............................................. 307/64; 363/125
[58] Field of Search ....................... 307/64, 66; 320/124, 320/128; 363/125

[56] References Cited

U.S. PATENT DOCUMENTS 5,278,454  1/1994  Strauss et al. ............................. 307/64
5,391,927  2/1995  Kazwara .................................. 307/66
5,811,895  8/1995  Suzuki et al. ........................... 307/125

OTHER PUBLICATIONS

Graf, Rudolf F., Encyclopedia of Electronic Circuits, Tab Books 1985, Figures 11–6 and 11–9, Jan. 1, 1985.

*Primary Examiner*—Josie Ballato
*Assistant Examiner*—Robert L. Deberadinis
*Attorney, Agent, or Firm*—Staas & Halsey LLP

[57] ABSTRACT

A compact, low-cost outage management emergency power supply device with a simple constitution is provided by connecting an auxiliary capacitor and charging battery to a DC link portion. In one embodiment, an auxiliary capacitor is connected in series via a switching circuit to a DC link portion which supplies direct-current voltage of a converter device which converts alternating-current voltage to direct-current voltage, and the input-output of current to the auxiliary capacitor is controlled by the switching circuit, so that the capacity of the additional auxiliary capacitor is not subject to limitations. Further, in another embodiment, a charging battery is connected to a DC link portion via a parallel circuit of a switching circuit or diode, and a resistor.

9 Claims, 10 Drawing Sheets

OUTAGE MANAGEMENT EMERGENCY POWER SUPPLY DEVICE

BACKGROUND OF THE INVENTION

1. Field of the Invention

The present invention relates to a power supply device for driving a machine tool and the like, and more particularly to an outage management emergency power supply device for supplying the energy required for outage management during a power failure.

2. Description of the Related Art

For a machine tool and the like, a variety of measures are carried out for dealing with an outage when a power failure occurs. As control items implemented in accordance with outage management, there are retract control, brake control, and drop prevention control.

In a numerically-controlled machine tool in which a tool and a workpiece are synchronized, when a power failure occurs, retract control maintains the synchronization of the workpiece and tool, and removes them to a location where they will not interfere with one another. In accordance with utilizing this control, damage caused by workpiece-tool synchronization drift is prevented. Machine tools, which perform this kind of retract control, include hobbing machines, gear grinding machines, polygon finishing machines and the like.

In machine tools for which the coasting distance of the feed rod during a power failure poses a problem, brake control performs braking and stopping so that a collision does not occur as a result of the inertial run of the feed rod.

For machines equipped with a gravity axis, drop prevention control maintains the present location so that the gravity axis does not drop when a power failure occurs and cause damage to the workpiece and tool.

Driving energy is required to carry out the above-described outage management, but since the driving energy supplied from the power source side during a power failure falls off abruptly, an emergency power supply device is required to supplement the deficiency by supplying energy.

The supply of deficient energy during outage management has in the past been carried out by an uninterruptible power supply (UPS) connected to a converter input portion.

A well-known UPS is a system called an M-G system, which combines a flywheel and a generator. With this M-G system, the flywheel is made to rotate under normal conditions, and when a power failure occurs, the flywheel drives the generator, and the obtained output is used as backup power.

The problems with utilizing a UPS as the supply source for energy needed during outage management following a power failure are that the constitution of the system is complex, and it requires maintenance, and the costs associated with the system itself and maintenance mount up. The fact that it requires a large installation area is also a problem.

When a relatively little energy is needed to deal with an outage, the deficient energy can be supplied by series connecting an auxiliary capacitor to a DC link portion, which is a direct current voltage supply line connected to the output of a converter.

FIG. 1 is an example of the constitution of an outage management emergency power supply device, which makes use of an auxiliary capacitor. In the constitution example of FIG. 1, a converter device 2 comprises a converting circuit 21 and a smoothing capacitor 20. The converting circuit 21 comprises a rectifier portion which converts an alternating-current power supply to direct current. The smoothing capacitor 20 is connected to the converting circuit 21 through a parallel circuit composed of a charging current-limiting resistor 22, a diode 23, and a thyristor 24. The connection terminal of the smoothing capacitor 20 constitutes a DC link portion 4.

An inverter device 3 comprises a converting circuit 31 and a smoothing circuit 30, receives direct-current current from the DC link portion 4, convert the DC current to alternating current, and supplies driving current to a motor 5.

An auxiliary capacitor 10 is connected to the DC link portion 4 of this converter device 2, and energy needed for outage management can be supplied by storing up energy in the auxiliary capacitor 10 during normal operation, and discharging energy therefrom when a power failure occurs.

When a lot of energy is required for outage management following a power failure, this can be dealt with by increasing the capacity of the auxiliary capacitor connected to the DC link portion 4, but the capacity of an auxiliary capacitor is limited. The reason for this is explained below using the circuit diagrams of FIG. 2A and FIG. 2B.

The first reason for this has to do with a problem that occurs at start-up of a converter device. When the converter device starts, an emergency charging current flows to the smoothing capacitors 20 and 30 as indicated by the arrows in FIG. 2A, and current is supplied to the auxiliary capacitor 10 from the DC link portion 4. When this happens, if the auxiliary capacitor 10 has a large capacity, the emergency charging current flowing to the smoothing capacitors 20 and 30 will be reduced, lengthening the time required for emergency charging. Consequently, to complete emergency charging within the prescribed time, the capacity of the auxiliary capacitor must be limited.

Further, because the current flowing to the charging current-limiting resistor 22 increases in line with the increase in capacity of the auxiliary capacitor 10, a charging current-limiting resistor which can stand a large current must be utilized, and the capacity of the auxiliary capacitor is limited by the size of the charging current-limiting resistor 22 used, and such set conditions as price.

Another reason has to do with a problem that occurs during an outage. In FIG. 2B, when a brief power failure occurs which is of such short duration that machine tool operation is not interrupted, because the energy supply from the power source line is cut off momentarily, DC link voltage decreases. When the duration of a brief power failure is long, the capacitors are charged during recovery in accordance with the voltage difference between the decreased DC link voltage and the recovered power source voltage. Because the charge performed at this time does not pass through the charging current-limiting resistor 22, a rush current flows into the capacitors (Refer to arrows in FIG. 2B). Since this rush current is proportional to the capacity of a capacitor, when the capacity of a capacitor is large, the current flow is excessive. This excessive current runs the risk of damaging converter input power components.

Consequently, the capacity of the capacitor connected to the DC link is limited in accordance with the tolerance of the converter input power components.

OBJECTS AND SUMMARY OF THE INVENTION

It is an object of the present invention to provide an outage management emergency power supply device with a simple constitution that can solve problems associated with conventional outage management emergency power supply devices, and further, it is an object to provide a compact, low-cost outage management emergency power supply device.

Accordingly, an outage management emergency power supply device of the present invention constitutes a compact, low-cost outage management emergency power supply device in accordance with a simple constitution, wherein an auxiliary capacitor and charging battery are connected to a DC link portion, and is constituted so that the capacity of the additional auxiliary capacitor is not limited.

A first embodiment of an outage management emergency power supply device of the present invention is constituted so as to comprise an auxiliary capacitor, which is series connected via a switching circuit to a DC link portion, which supplies direct-current voltage of a converter device which converts alternating-current voltage to direct-current voltage, and to control the inputoutput of current to the auxiliary capacitor in accordance with the switching circuit.

The DC link portion is a line for supplying direct-current voltage. It is connected to an output terminal of the converter device, receives a supply of direct-current voltage, and delivers and receives direct-current voltage to and from an inverter device. Further, the switching circuit is a circuit for controlling the input-output of current to the auxiliary capacitor, and controlling the current direction via this switching circuit removes the cause for limiting the capacity of the auxiliary capacitor, enabling the connection of a large-capacity auxiliary capacitor.

In accordance with this embodiment, when the converter device starts, a charging current flowing to the auxiliary capacitor from the DC link portion is limited by the switching circuit, charging current is supplied to the converter device smoothing capacitor or the inverter device smoothing capacitor, and charging of these smoothing capacitors is performed. Charging of the auxiliary capacitor is performed by supplying charging current via the switching circuit after the smoothing capacitors of the converter device and inverter device have been charged. In accordance with this, it is possible to prevent the lengthening of charging time resulting from the connection of an auxiliary capacitor.

Further, during recovery from a brief power failure, supplying charging current from the DC link portion to the auxiliary capacitor via a resistor provided within the switching circuit reduces the charging current value, and in accordance therewith, prevents the inflow of excessive rush current.

During a power failure, outage management for machine tools and the like is performed by supplying energy to the DC link portion from the auxiliary capacitor via the switching circuit.

Furthermore, the switching circuit in this embodiment can be constituted with a circuit, wherein a series circuit, which connects in series a first switching means for controlling current to the auxiliary capacitor, and a current-limiting resistor, is connected in parallel to a second switching means for controlling a current discharge from the auxiliary capacitor during a power failure.

This first switching means can be constituted by using a relay or the like, and limits the charging current flowing to the auxiliary capacitor from the DC link portion when the converter device starts-up. Further, the current-limiting resistor thereof limits rush current by reducing the charging current supplied to the auxiliary capacitor from the DC link portion during recovery from a brief power failure.

Furthermore, the second switching means can be constituted by using semiconductor switching elements such as a thyristor and a transistor, or a relay, and discharges current from the auxiliary capacitor to the DC link portion side during a power failure.

A second embodiment of an outage management emergency power supply device of the present invention is constituted so as to comprise a charging battery, which is connected in series via a switching circuit to a DC link portion, which supplies the direct-current voltage of a converter device which converts alternating-current voltage to direct-current voltage, and so that the abovementioned switching circuit controls the input-output of current to the charging battery.

This switching circuit is a circuit for controlling the input-output of current to the charging battery, and in accordance with the control of current direction by this switching circuit, control is implemented for charging during normal cooperation, and for discharging when a power failure occurs.

In accordance with this embodiment, when the converter device starts, charging is performed while charging current flowing to the charging battery from the DC link portion is limited by the switching circuit, charging is performed for these smoothing capacitors by supplying charging current to the converter device smoothing capacitor or inverter device smoothing capacitor. The time constant for charging the charging battery can be set longer than the time constant for charging the smoothing capacitors of the converter device and inverter device, making it possible to prevent the lengthening of smoothing capacitor charging time.

Further, during recovery from a brief power failure, supplying charging current from the DC link portion to the charging battery via the resistor of the switching circuit reduces the charging current value, and thus prevents the inflow of excessive rush current.

During a power failure, outage management for machine tools and the like is performed by supplying energy to the DC link portion from the charging battery via the switching circuit.

Furthermore, the switching circuit of this embodiment can be constituted with a circuit, wherein a current-limiting resistor, which controls the current to the charging battery, and a second switching means, which controls the current discharge from the charging battery during a power failure, are connected in parallel.

This current-limiting resistor limits the current flowing to the charging battery, and sets the time constant for charging the charging battery when the converter device starts, or, reduces the charging current flowing to the charging battery from the DC link portion, and limits rush current during recovery from a brief power failure. Further, the second switching means can be constituted from semiconductor switching elements such as a thyristor and a transistor, or a relay, and discharges charging battery current to the DC link portion side during a power failure.

A third embodiment of an outage management emergency power supply device of the present invention is constituted so that a charging battery is series connected to a DC link portion, which supplies the direct-current voltage of a converter device which converts alternating-current voltage to direct-current voltage, via a parallel circuit comprising a current-limiting resistor which controls the current to the charging battery, and a current direction-limiting component which carries out current discharge from the charging battery to the DC link portion side during a power failure, and the input-output of current to the charging battery is controlled by this circuit.

This parallel circuit is a circuit for controlling input-output of current to the charging battery, and in accordance with the control of current direction by this parallel circuit, control is implemented for charging during normal operation, and for discharging during a power failure.

In accordance with this embodiment, when a converter device starts-up, charging is performed while charging current flowing to the charging battery from the DC link portion is limited by the current-limiting resistor, charging current is supplied to the converter device smoothing capacitor or inverter device smoothing capacitor, and charging is performed for these smoothing capacitors. By setting the time constant for charging the charging battery so that it is longer than the time constant for charging the smoothing capacitors of the converter device and inverter device, it is possible to prevent the lengthening of smoothing capacitor charging time.

Further, during recovery from a brief power failure, supplying charging current from the DC link portion to the charging battery via a resistor of the current-limiting resistor reduces the charging current value, and in accordance therewith, prevents the inflow of excessive rush current.

During a power failure, outage management for machine tools and the like is performed by supplying energy to the DC link portion from the charging battery via the current direction-limiting component.

As described above, in accordance with the present invention, it is possible to provide an outage management emergency power supply device which is a simple in constitution, compact and low cost.

BRIEF DESCRIPTION OF THE DRAWINGS

The foregoing and other objects and features of the invention will become apparent from the following description of preferred embodiments of the invention with respect to the accompanying drawings, in which.

DETAILED DESCRIPTION OF THE PREFERRED EMBODIMENTS

Figure 1:
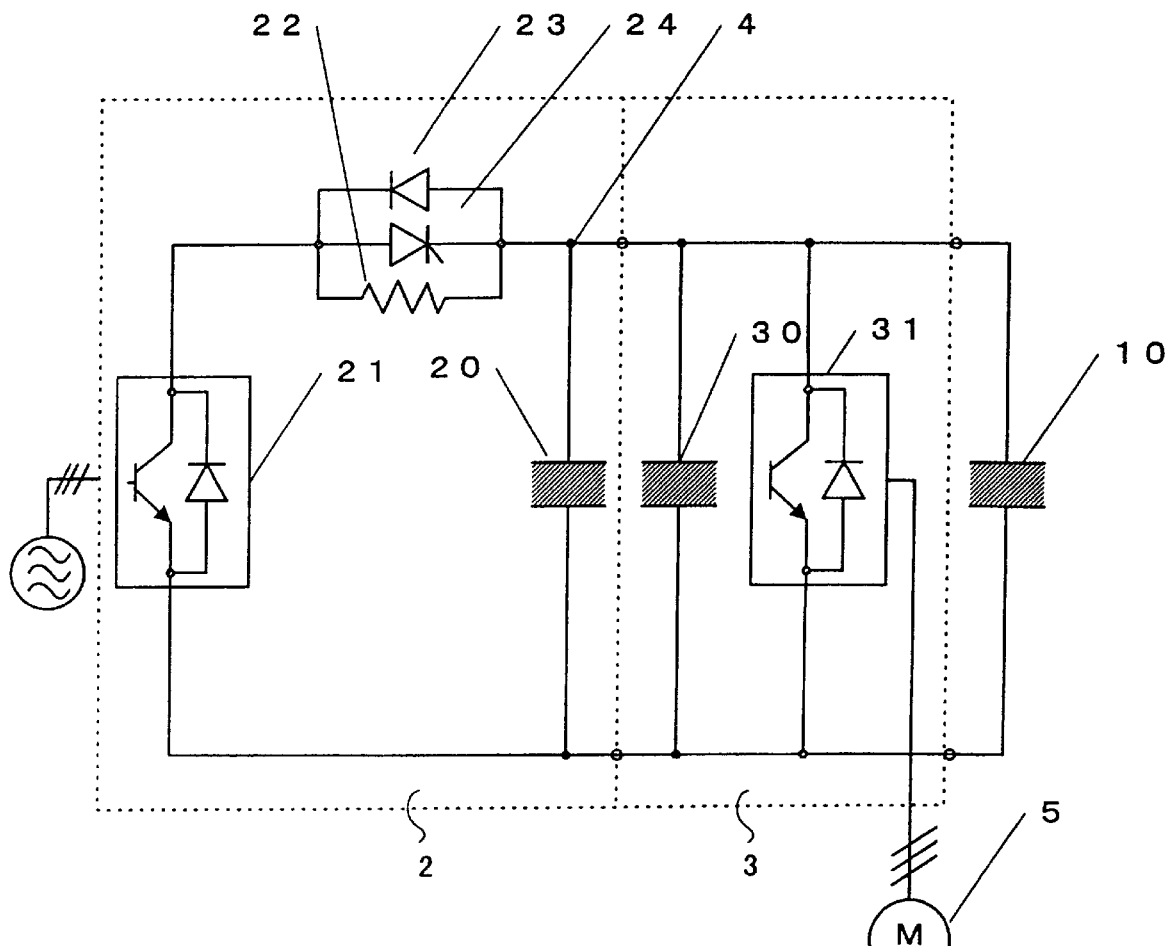
FIG. 1 is a circuit diagram showing an example of a conventional outage management emergency power supply device, which utilizes an auxiliary capacitor.
Figure 2A:
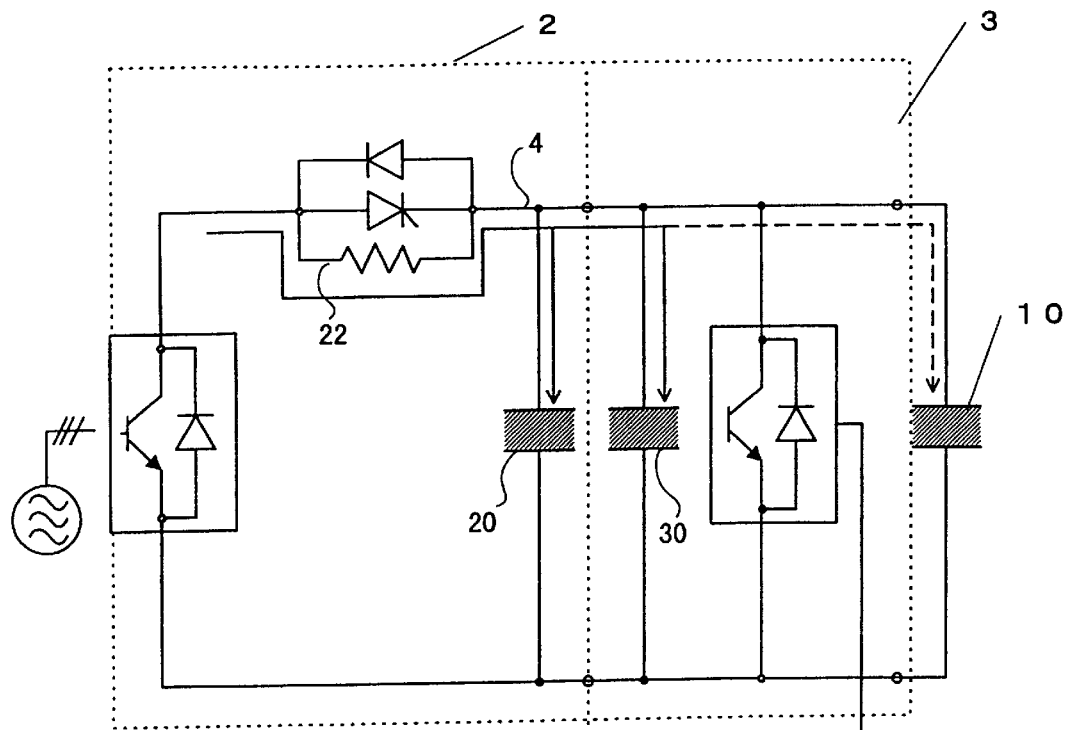
FIG. 2A and FIG. 2B are circuit diagrams for explaining the capacity limits of the auxiliary capacitor of the outage management emergency power supply device of FIG. 1.
Figure 2B:
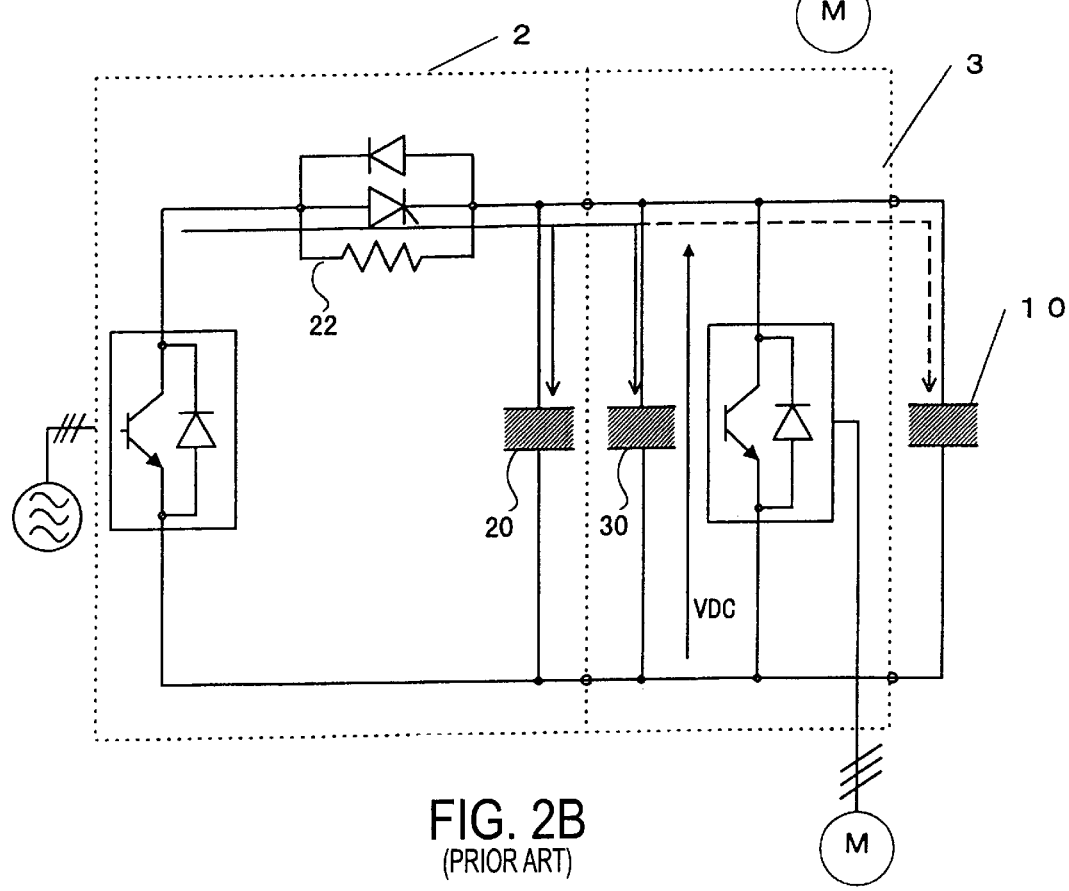
Figure 3:
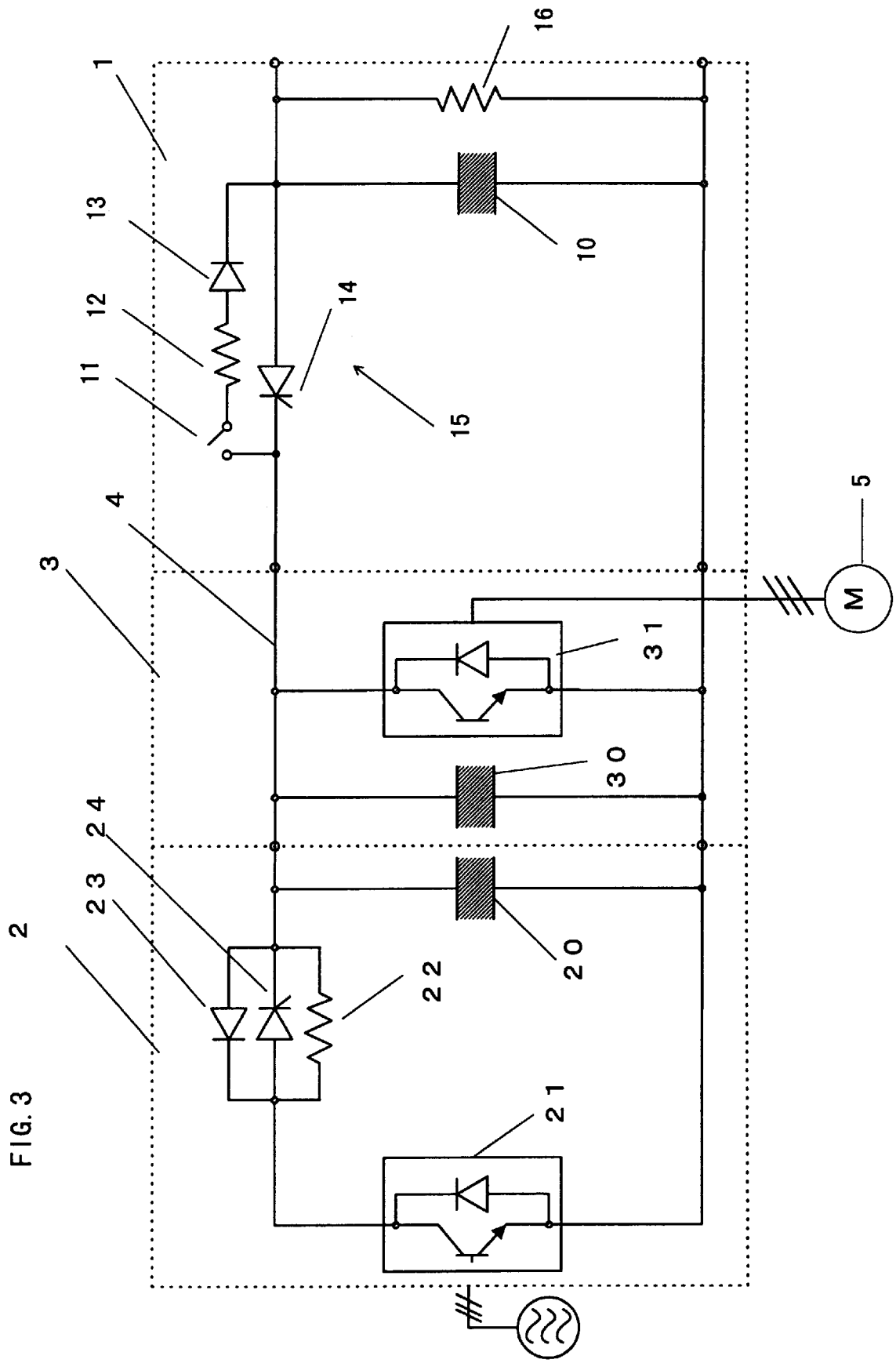
FIG. 3 is a circuit diagram for explaining a first embodiment of an outage management emergency power supply device in accordance with the present invention.

Firstly, a first embodiment of an outage management emergency power supply device in accordance with the present invention is explained using the circuit diagram of FIG. 3.

The outage management emergency power supply device 1 of this embodiment supplies outage management energy using an auxiliary capacitor, series connects the auxiliary capacitor to a DC link portion via a switching circuit, and controls the input-output of current to the auxiliary capacitor via the switching circuit.

A converter device 2 comprises a converting circuit 21, which comprises a rectifier portion that converts a current from an alternating-current power supply to direct current, a parallel circuit which comprises a charging current-limiting resistor 22, a diode 23 and a thyristor 24, and a smoothing capacitor 20 which are connected via this parallel circuit to the converting circuit 21. Both connection terminals of the smoothing capacitor 20 constitute a DC link portion 4.

An inverter device 3 comprises a converting circuit 31 and a smoothing circuit 30. The converting circuit 31 receives direct-current current from the DC link portion 4, converts it to alternating current, and supplies driving current to a motor 5.

As for the emergency power supply device 1, the auxiliary capacitor 10 is connected to the DC link portion 4 via a switching circuit 15. This switching circuit 15 controls the flow of current to the auxiliary capacitor 10, and supplies the energy needed for outage management by storing energy in the auxiliary capacitor 10 during normal operation, and discharging energy therefrom during a power failure.

The switching circuit 15 comprises a serially-connected body of a first switching means 11, a current-limiting resistor 12 and a diode 13, and a second switching means 14 connected in parallel to the serially-connected body.

The first switching means 11 and current-limiting resistor 12 control current to the auxiliary capacitor 10. The diode 13 is for preventing a reverse flow of current to the DC link portion 4 from the auxiliary capacitor 10. The anode side of diode 13 is connected to the current-limiting resistor 12, and the cathode side is connected to the auxiliary capacitor 10, respectively. The second switching means 14 controls the discharge of current from the auxiliary capacitor 10 during a power failure.

The first switching means 11 can be constituted from a relay or the like, it performs switching control in accordance with a controlling circuit (not shown), and it limits the charging current flowing from the DC link portion 4 to the auxiliary capacitor 10 when the converter device 2 starts. The current-limiting resistor 12 reduces the charging current flowing from the DC link portion 4 to the auxiliary capacitor 10 during recovery from a brief power failure, thereby limiting rush current.

The second switching means 14 can be constituted from semiconductor switching element such as a thyristor or transistor, or a relay, and discharges current from the auxiliary capacitor 10 to the DC link portion 4 side during a power failure.

Furthermore, a discharge resistor 16 is connected to the DC link portion 4 parallel to the auxiliary capacitor 10.

Figure 4:
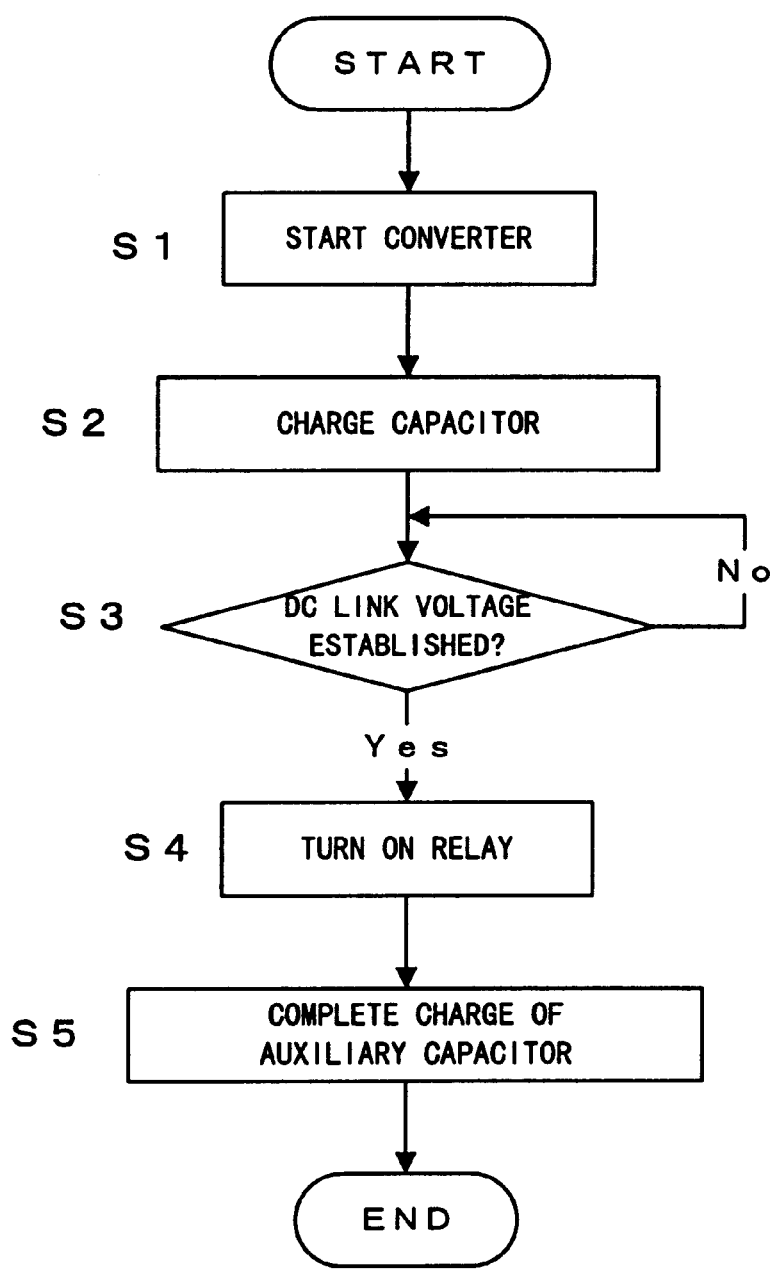
FIG. 4 is a flowchart for explaining the operation of the first embodiment of an outage management emergency power supply device of the present invention.
Figure 5:
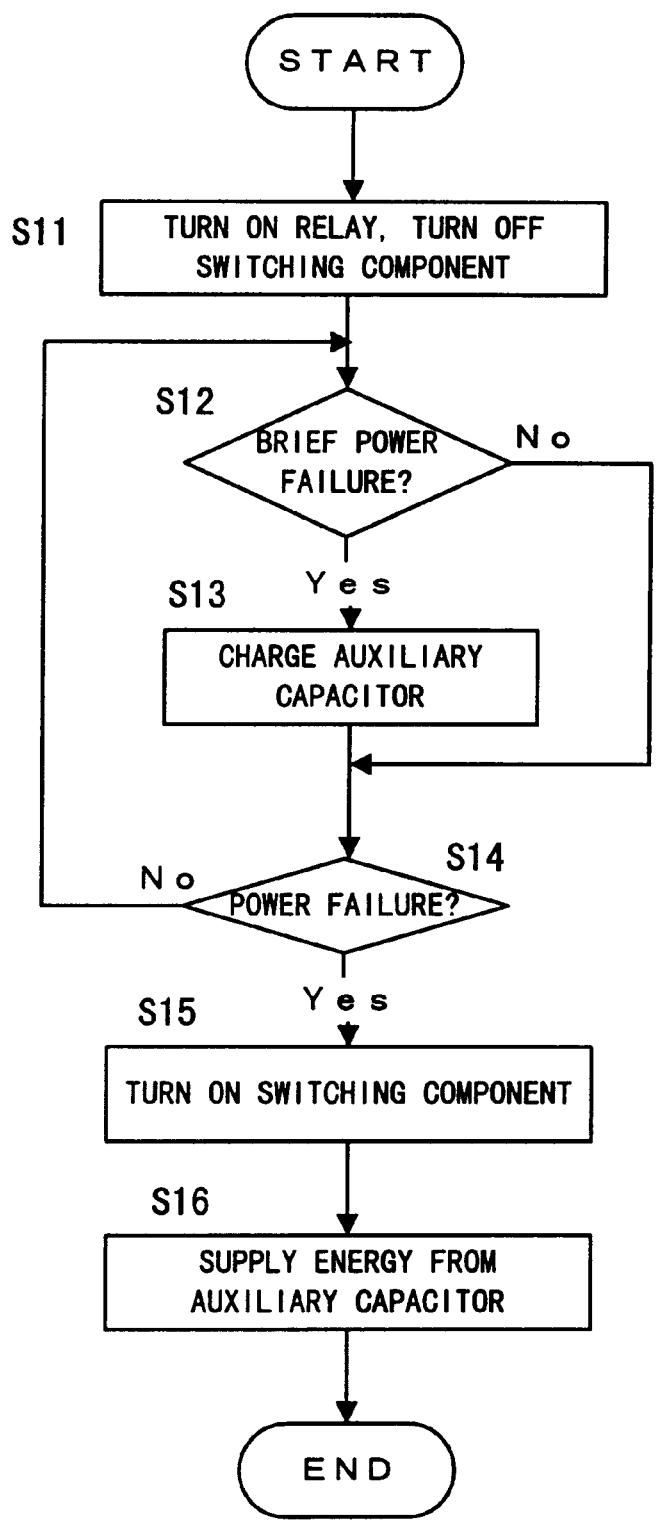
FIG. 5 is a flowchart for explaining the operation of the first embodiment of an outage management emergency power supply device of the present invention.
Figure 6:
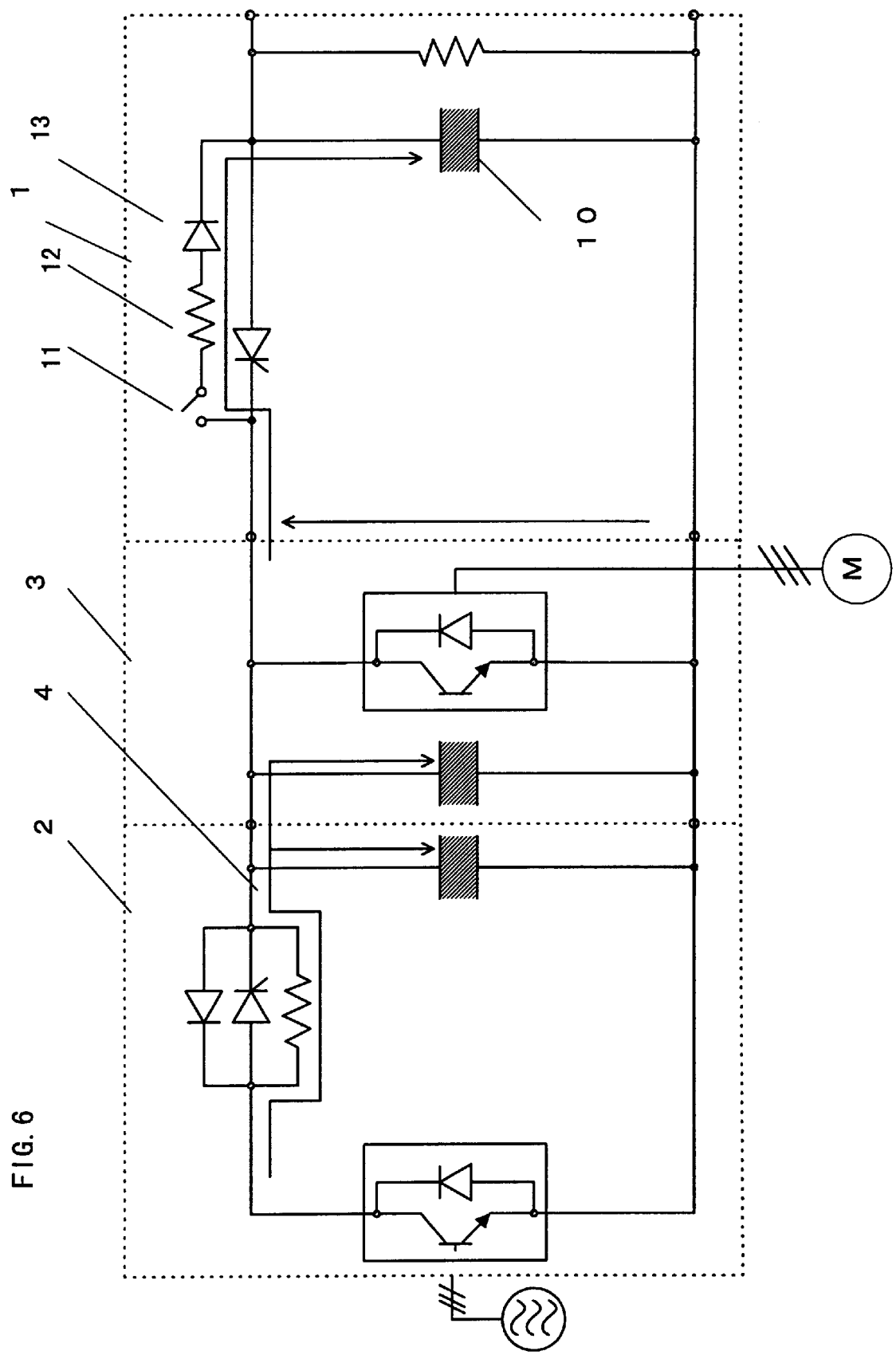
FIG. 6 is a circuit diagram for explaining the operation of the first embodiment of an outage management emergency power supply device of the present invention.
Figure 7:
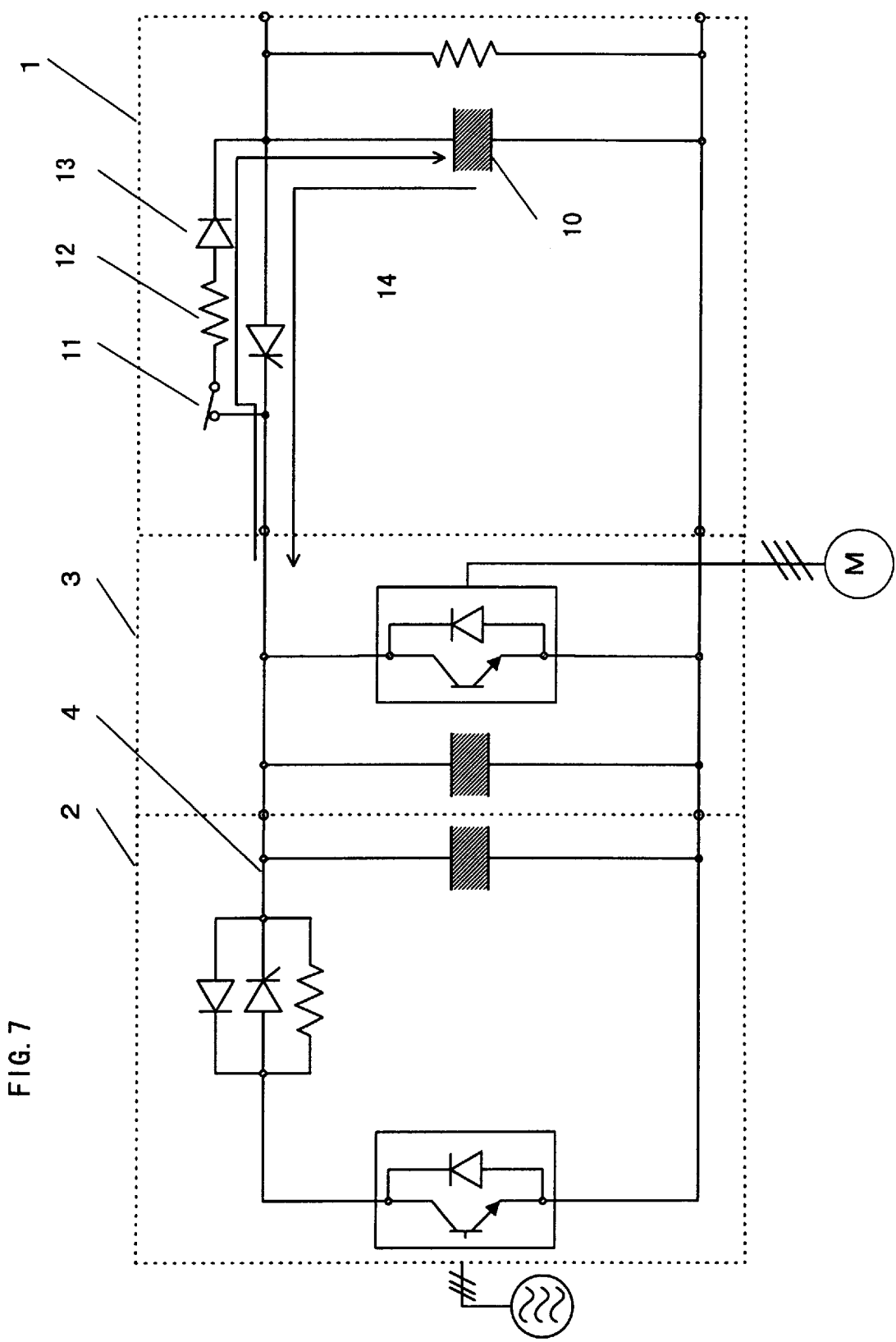
FIG. 7 is a circuit diagram for explaining the operation of the first embodiment of an outage management emergency power supply device of the present invention.

Next, the operation of the emergency power supply device 1 according to this embodiment is explained using the flowcharts of FIGS. 4, 5, the operational circuit diagrams of FIGS. 6, 7, and the timing charts of FIG. 8.

The starting of converter device 2, and charging operation of the auxiliary capacitor 10 in the emergency power supply device 1 are explained using the flowchart of FIG. 4, and the operational circuit diagram of FIG. 6.

Figure 8A:
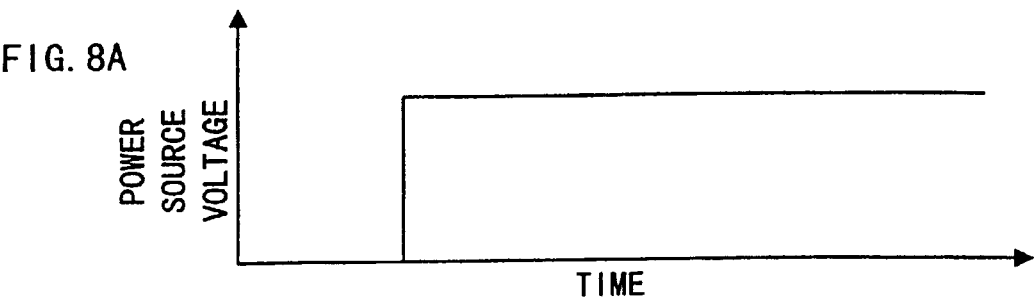
FIGS. 8A through 8D are timing charts for explaining the operation of the first embodiment of an outage management emergency power supply device of the present invention.
Figure 8B:
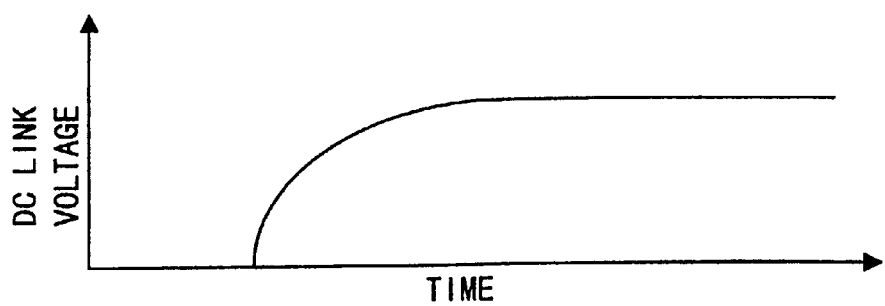
Figure 8C:
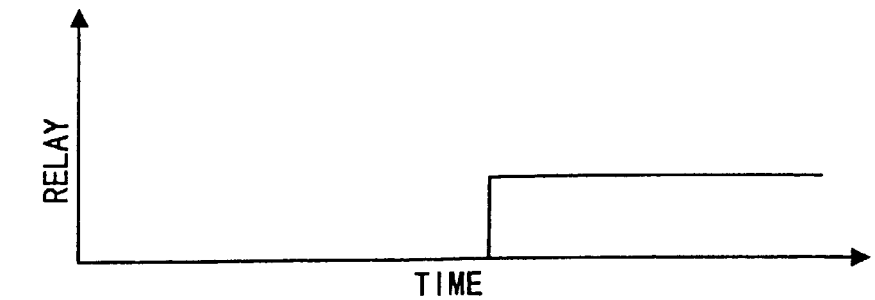

When the converting circuit 21 of the converter device 2 is driven, alternating current is converted to direct current (FIG. 8A) and a direct-current voltage is formed at the DC link portion 4 (FIG. 8B). At this time, the first switching means 11 of the switching circuit 15 in the emergency power supply device 1 is in OFF state, and charging to the auxiliary capacitor 10 is not carried out (Step S1).

Accompanying the formation of this direct-current voltage, a emergency charging is carried out from the DC link portion 4 to the capacitor 20 of the converter device 2 and the capacitor 30 of the inverter device 3 via the charging current-limiting resistor 22 (Step S2).

Figure 8D:
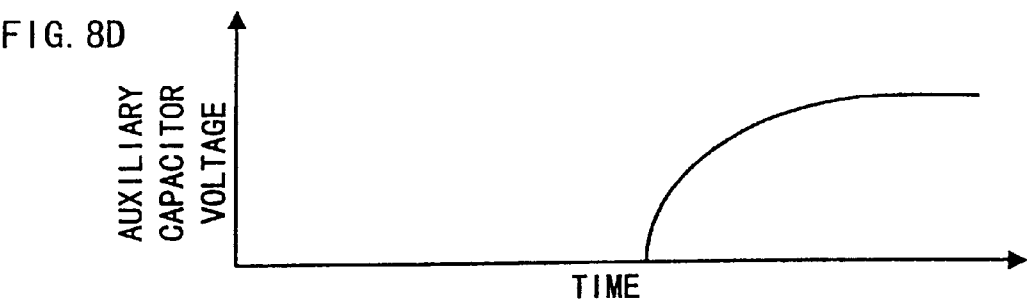

Once the DC link portion 4 voltage has been established (Step S3), the first switching means 11 turns ON (FIG. 8C), charging current is supplied to the auxiliary capacitor 10 via the current-limiting resistor 12 and the diode 13 (Step S4), and charging of the auxiliary capacitor 10 is completed (FIG. 8D). This charging of the auxiliary capacitor 10 is completed before outage management is performed (Step S5).

The discharge operation of the auxiliary capacitor 10 during a power failure is explained using the flowchart of FIG. 5, and the operational circuit diagram of FIG. 7.

Once charging of the auxiliary capacitor 10 is completed, the first switching means 11 goes ON, and the second switching means 14 goes OFF. In accordance therewith, under normal circumstance, the auxiliary capacitor 10 is kept of the direct-current voltage of the DC link portion 4 (Step S11)

In this situation, when voltage recovers following the occurrence of a brief power failure (Step S12), a rush current flows from the DC link portion 4 to the auxiliary capacitor 10 side via the current-limiting resistor 12. Because this rush current is limited by the current-limiting resistor 12, it is prevented from becoming an excessive current (Step S13).

Further, when a power failure occurs (Step S14), the second switching means 14 is turned ON by a controlling circuit (not shown) (Step S15). Discharging current from the auxiliary capacitor 10 side is supplied to the DC link portion 4 to supply energy to the DC link portion 4 (Step S16), thus outage management is performed.

Figure 9:
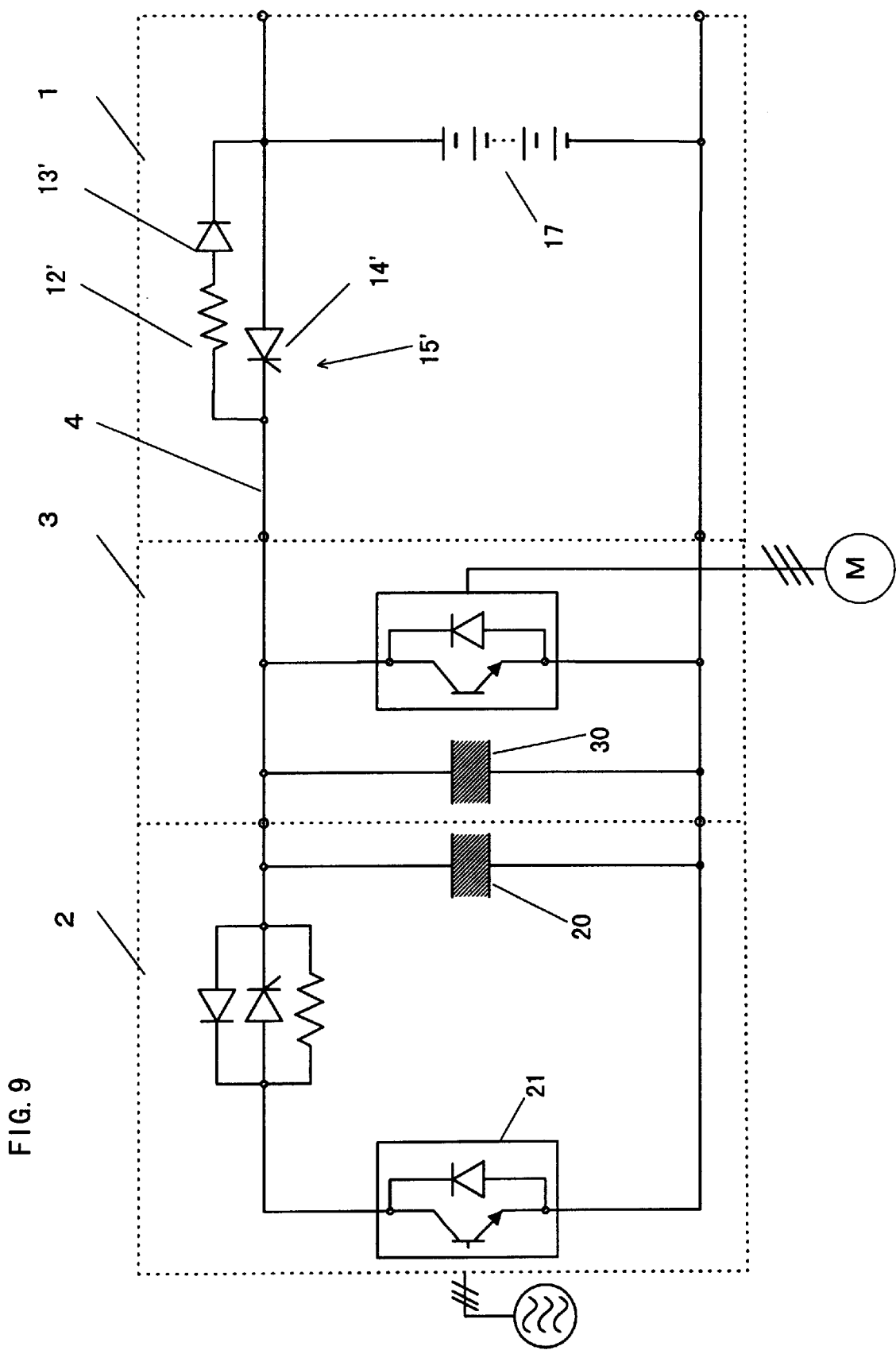
FIG. 9 is a circuit diagram for explaining a second embodiment of an outage management emergency power supply device in accordance with the present invention.

Next, a second embodiment of an outage management emergency power supply device according to the present invention is explained using the circuit diagram of FIG. 9.

In the outage management emergency power supply device 1 of this embodiment, a charging battery is used to supply energy for outage management. A charging battery is connected in series to a DC link portion via a switching circuit, thereby control is implemented by controlling current direction in accordance with the switching circuit so that charging is carried out during normal operation, and discharging is carried out during a power failure.

Of the circuits illustrated in FIG. 9, the converter device 2 and inverter device 3 can be substantially of the same constitution as the converter device 2 and inverter device 3 shown in FIG. 3, and as such, an explanation is omitted here.

As for the emergency power supply device 1, a charging battery 17 is connected to a DC link portion 4 via a switching circuit 15'. This switching circuit 15' controls the current to the charging battery 17, and supplies the energy required for outage management by storing energy in the charging battery during normal operation, and discharging energy therefrom during a power failure.

The switching circuit 15' comprises a serially-connected body of a current-limiting resistor 12' and a diode 13', and a switching means 14' connected in parallel to the serially-connected body. The current-limiting resistor 12' controls the current to the charging battery 17. That is, the current-limiting resistor 12' reduces the charging current supplied to the charging battery 17 from the DC link portion 4 during recovery from a brief power failure, thereby limiting the rush current. The diode 13' is for preventing the reverse flow of current to the DC link portion 4 from the charging battery 17. The anode side of diode 13' is connected to the current-limiting resistor 12' side, and the cathode side is connected to the charging battery 17 side, respectively. The switching means 14' controls the discharge of current from the charging battery 17 during a power failure, and can be constituted using a semiconductor switching element such as thyristor, transistor, or relay. Further, switching means 14' discharges current from the charging battery 17 to the DC link portion 4 during a power failure.

The operation of the emergency power supply device 1 according to this embodiment is explained below.

When the converter device 2 starts, the current-limiting resistor 12' of the switching circuit 15' performs charging while limiting the charging current flowing from the DC link portion 4 to the charging battery 17. The DC link portion 4 supplies charging current to the smoothing capacitor 20 of the converter device 2, as well as the smoothing capacitor 30 of the inverter device 3 at this time, and charges these smoothing capacitors. The time constant for charging the charging battery can be adjusted in accordance with the resistance value of the current-limiting resistor 12'. By setting the time constant for charging the charging battery longer than the time constant for charging the smoothing capacitors 20 and 30 of the converter device 2 and inverter device 3 sides, it is possible to prevent the lengthening of the charging time of the smoothing capacitors 20, 30.

Further, during recovery from a brief power failure, supplying charging current from the DC link portion 4 to the charging battery 17 via the current-limiting resistor 12' of the switching circuit 15' reduces the charging current value, and in accordance therewith, prevents the inflow of excessive rush current.

During a power failure, the switching means 14' of the switching circuit 15' is turned ON, and energy is supplied from the charging battery 17 to the DC link portion 4.

Figure 10:
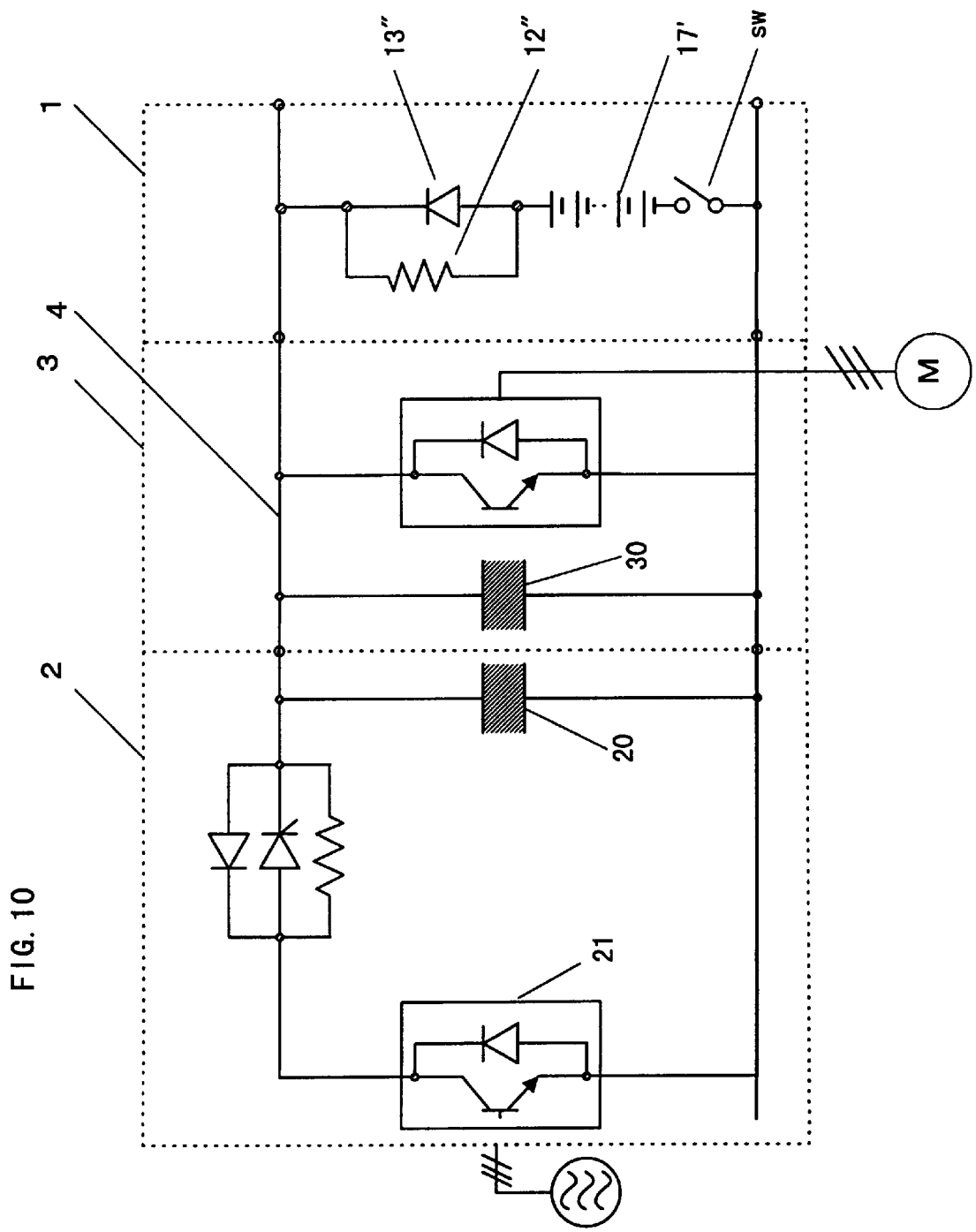
FIG. 10 is a circuit diagram for explaining a third embodiment of an outage management emergency power supply device in accordance with the present invention.

Next, a third embodiment of an outage management emergency power supply device according to the present invention is explained using the circuit diagram of FIG. 10.

The emergency power supply device according to this embodiment is the same as the emergency power supply device according to the second embodiment, and uses a charging battery to supply energy for outage management. A charging battery is connected in series to a DC link portion, and control is performed in accordance with current control by a current direction-limiting component so that charging is carried out during normal operation, and discharging is carried out during a power failure.

Of the circuits illustrated in FIG. 10, the converter device 2 and inverter device 3 can be substantially of the same constitution as the converter device 2 and inverter device 3 shown in FIG. 3 (and FIG. 9), and as such, an explanation is omitted here.

As for the emergency power supply device 1, a charging battery 17' is connected to a DC link portion 4 via a parallel circuit of a current-limiting resistor 12" and a diode 13". This parallel circuit controls the current to the charging battery 17', and supplies the energy required for outage management by storing energy in the charging battery 17' during normal operation, and discharging energy therefrom during a power failure.

In the parallel circuit, the current-limiting resistor 12" controls the charging current to the charging battery 17', and curbs the lengthening of the charging time of the smoothing capacitors 20 and 30 of the converter device 2 and inverter device 3 sides. Further, it reduces the charging current flowing to the charging battery 17' from the DC link portion 4 during recovery from a brief power failure, thereby limiting the rush current.

The diode 13" is mounted by connecting the anode side to the DC link portion 4, and connecting the cathode side to the charging battery 17', and it discharges current from the charging battery 17' to the DC link portion 4 side during a power failure.

The operation of the emergency power supply device 1 according to this embodiment is explained below.

When the converter device 2 starts, the current-limiting resistor 12" performs charging while limiting the charging current flowing from the DC link portion 4 to the charging battery 17'. The DC link portion 4 supplies charging current to the smoothing capacitor 20 of the converter device 2, as well as the smoothing capacitor 30 of the inverter device 3 at this time, charging these smoothing capacitors. The time constant for charging the charging battery 17' can be adjusted using the resistance value of the current-limiting resistor 12". By setting the time constant for charging the charging battery longer than the time constant for charging the smoothing capacitors 20 and 30 of the converter device 2 and inverter device 3 sides, it is possible to prevent the lengthening of the charging time of the smoothing capacitors 20 and 30.

Further, during recovery from a brief power failure, supplying charging current from the DC link portion 4 to the charging battery 17' via the current-limiting resistor 12" reduces the charging current value, and in accordance therewith, prevents the inflow of excessive rush current.

During a power failure, energy is supplied from the charging battery 17' to the DC link portion 4 via the diode 13".

When the main circuit power supply is in OFF state, there are cases in which discharging steadily progresses via the current-limiting resistor 12" in accordance with the discharge resistance of the DC link portion, and capacitor leakage current. Consequently, if the switch SW, which is connected in series to the charging battery, is in OFF state when the main circuit power supply is in OFF state, then discharge can be prevented with this constitution.

What is claimed is:

1. An outage management emergency power supply device, comprising:

an auxiliary capacitor connected in series via a switching circuit to a DC link portion which supplies direct-current voltage of a converter device, which converts alternating-current voltage to direct-current voltage, wherein said switching circuit controls the input-output of current to the auxiliary capacitor based upon the occurrence of an alternating-current power failure, and limits rush current to the auxiliary capacitor, said rush current being caused by a return to power subsequent to the alternating-current power failure.

2. The outage management emergency power supply device according to claim 1, wherein said switching circuit comprises a serial circuit of a current-limiting resistor and a first switching means for controlling the current to the auxiliary capacitor, and a second switching means for controlling current discharge from the auxiliary capacitor during a power failure, connected in parallel to the serial circuit.

3. The outage management emergency power supply device according to claim 2, wherein said first switching means is a relay, and the second switching means is a semiconductor switching element.

4. An outage management emergency power supply device, comprising:

a charging battery connected in series via a switching circuit to a DC link portion which supplies direct-current voltage of a converter device which converts alternating-current voltage to direct-current voltage, wherein said switching circuit controls the input-output of current to the charging battery based upon the occurrence of an alternating-current power failure, and limits rush current to the charging battery, said rush current being caused by a return to power subsequent to the alternating-current power failure.

5. The outage management emergency power supply device according to claim 4, wherein said switching circuit comprises a current-limiting resistor which controls current to the charging battery, and a second switching means for controlling current discharge from the charging battery during a power failure, connected in parallel to the current-limiting resistor.

6. The outage management emergency power supply device according to claim 5, wherein said second switching means is a semiconductor switching element.

7. An outage management emergency power supply device, wherein a charging battery is connected in series to a DC link portion which supplies direct-current voltage of a converter device which converts alternating-current voltage to direct-current voltage, via a parallel circuit of a current-limiting resistor which controls current to the charging battery, and a current direction limiting component which discharges current from the charging battery to the DC link portion side during an alternating-current power failure and controls the limiting of rush current to the charging battery, said rush current being caused by a return to power subsequent to the alternating-current power failure.

8. An outage management emergency power supply device, comprising:

a first converting circuit to convert alternating-current voltage to direct-current voltage and supplying said converted voltage to a DC link portion;

a second converting circuit to convert the voltage applied to the DC link portion to alternating-current voltage;

a switching circuit; and a charging battery connected in series via the switching circuit to the DC link portion, wherein said switching circuit controls input-output of current to the charging battery based upon the occurrence of a power failure of the alternating-current, and limits rush current to the charging battery, said rush current being caused by a return to power subsequent to the alternating-current power failure.

9. The outage management emergency power supply device according to claim 8, wherein said switching circuit comprises a current-limiting resistor which controls current to the charging battery, and a switching means for controlling current discharge from the charging battery during a power failure, connected in parallel to the current-limiting resistor.

* * * * *

UNITED STATES PATENT AND TRADEMARK OFFICE
CERTIFICATE OF CORRECTION

PATENT NO.:     6,133,651
DATED     :     October 17, 2000
INVENTOR(S):    Shinichi KONO, et al.

It is certified that an error appears in the above-identified patent and that said Letters Patent is hereby corrected as shown below:

Column 10,
> line 19, change "charging battery" to --auxiliary capacitor--.

Signed and Sealed this

Eighth Day of May, 2001

*Attest:*

NICHOLAS P. GODICI

*Attesting Officer*   Acting Director of the United States Patent and Trademark Office